US008560546B2

(12) United States Patent
Frieder et al.

(10) Patent No.: US 8,560,546 B2
(45) Date of Patent: *Oct. 15, 2013

(54) SYSTEM FOR SIMILAR DOCUMENT DETECTION

(75) Inventors: Ophir Frieder, Chicago, IL (US); Abdur R. Chowdhury, Oakton, VA (US)

(73) Assignee: Alion Science and Technology Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/363,806

(22) Filed: Feb. 1, 2012

(65) Prior Publication Data

US 2012/0197913 A1 Aug. 2, 2012

Related U.S. Application Data

(63) Continuation of application No. 12/643,662, filed on Dec. 21, 2009, now Pat. No. 8,131,724, which is a continuation of application No. 09/629,175, filed on Jul. 31, 2000, now Pat. No. 7,660,819.

(51) Int. Cl.
*G06F 7/00* (2006.01)
*G06F 17/30* (2006.01)

(52) U.S. Cl.
USPC .............. 707/737; 707/748; 707/754

(58) Field of Classification Search
None
See application file for complete search history.

(56) References Cited

U.S. PATENT DOCUMENTS

| 6,240,409 | B1 | 5/2001 | Aiken |
| 6,349,296 | B1 | 2/2002 | Broder et al. |
| 6,493,709 | B1 | 12/2002 | Aiken |
| 6,547,829 | B1 | 4/2003 | Meyerzon et al. |
| 6,594,665 | B1 | 7/2003 | Sowa et al. |

OTHER PUBLICATIONS

C. Buckley, C. Cardie, S. Mardis, M. Mitra, D. Pierce, K. Wagstaff, and J. Walz, "The Smart/Empire TIPSTER 111 System," *TIPSTER Phase III Proceedings*, Morgan Kaufmann, 2000.
V. Chalana, A. Bruce, and T. Nguyen, "Duplicate Document Detection in DocBrowse," www.statsci.com/docbrowse/paper/spie98/node 1.htm, Jul. 31, 1999.
G. Salton, A. Wong and C.S. Yang, "A Vector Space Model for Automatic Indexing," *Comm. of the ACM*, vol. 18, No. 11, pp. 613-620, Nov. 1975.
M. F. Porter, "An Algorithm for Suffix Stripping," *Program*, vol. 14, No. 3, pp. 130-137, Jul. 1980.
B. Kjell, W.A. Woods, and O. Frieder, "Discrimination of Authorship Using Visualization," *Information Processing and Management*, Pergamon Press, vol. 30, No. 1, pp. 141-150, Jan. 1994.
R. S. Scotti and C. Lilly, "Analysis and Design of Test Corpora for Zero-Tolerance Government Document Review Process," Symposium for Document Image Understanding Technology, Annapolis, Maryland, Apr. 1999.
D. Grossman, D. Holmes, and 0. Frieder, "A Parallel DBMS Approach to IR in TREC-3", *Overview of the Third Text Retrieval Conference (TREC-3)*, Nov. 1994.

(Continued)

*Primary Examiner* — Uyen Le
(74) *Attorney, Agent, or Firm* — Staas & Halsey LLP (57) ABSTRACT

A document is compared to the documents in a document collection using a hash algorithm and collection statistics to detect if the document is similar to any of the documents in the document collection.

1 Claim, 4 Drawing Sheets

(56) References Cited

OTHER PUBLICATIONS

A. F. Smeaton, F. Kelledy, and G. Quinn, "Ad Hoc Retrieval Using Thresholds, WSTs for French Monolingual Retrieval, Document-at-a-Glance for High Precision and Triphone Windows for Spoken Documents," *Proceedings of the Sixth Text Retrieval Conference (TREC-6)*, p. 461, 1997.
S. Lawrence and C. L. Giles, "Accessibility of Information on the Web," Nature, vol. 400, Jul. 8, 1999.
http://nccam.nih.gov, The National Institutes of Health (Nil), National Center for Complementary and Alternative Medicine (NCCAM), Apr. 12, 2000.
A.Z. Broder, S.C. Glassman, M. S. Manasse, and G. Zweig, "Syntactic Clustering of the Web," Sixth International World Wide Web Conference, Apr. 1997.
A.Z. Broder, S.C. Glassman, M. S. Manasse, and G. Zweig, "Syntactic Clustering of the Web," Sixth International World Wide Web Conference, Jul. 1997.
S. Brin, J. Davis, and H. Garcia-Molina, "Copy Detection Mechanisms for Digital Documents," *Proceedings of the ACM SIGMOD Annual Conference*, May 1995.
N. Shivakumar and H. Garcia-Molina, "Finding Near-Replicas of Documents on the Web," *Proceedings of Workshop on Web Databases* (WebDB'98), Mar. 1998.
N. Shivakumar and H. Garcia-Molina, "SCAM: A Copy Detection Mechanism for Digital Documents," *Proceedings of the Second International Conference in Theory and Practice of Digital Libraries*, Jun. 1995.
N. Shivakumar and H. Garcia-Molina, "Building a Scalable and Accurate Copy Detection Mechanism," *Proceedings of Third International Conference on Theory and Practice of Digital Libraries*, Mar. 1996.
U.S. Department of Commerce, National Institute of Standards and Technology, "Secure Hash Standard," Federal Information Processing Standards Publication FIPS PUB 180-1, Apr. 17, 1995.
U.S. Department of Commerce, National Institute of Standards and Technology, "Secure Hash Standard," Federal Information Processing Standards Publication FIPS PUB 180, May 11, 1993.
Ronald L. Rivest, "The MD4 Message Digest Algorithm," *Proceedings of Advances in Cvrptology—CRYPTO '90*, Springer-Verlag, pp. 303-311, 1991.
D. A. Grossman, D. 0. Holmes, 0. Frieder, M. D. Nguyen and C. E. Kingsbury, "Improving Accuracy and Run-Time Performance for TREC-4", *Overview of the Fourth Text Retrieval Conference (TREC-4)*, Nov. 1995.
Office Action issued in copending U.S. Appl. No. 09/629,175, dated Oct. 24, 2002.
Office Action issued in copending U.S. Appl. No. 09/629,175, dated Apr. 10, 2003.
Office Action issued in copending U.S. Appl. No. 09/629,175, dated Sep. 3, 2003.
Office Action issued in copending U.S. Appl. No. 09/629,175, dated Jan. 13, 2004.
Office Action issued in copending U.S. Appl. No. 09/629,175, dated Apr. 26, 2004.
Office Action issued in copending U.S. Appl. No. 09/629,175, dated Mar. 18, 2005.
Office Action issued in copending U.S. Appl. No. 09/629,175, dated. Sep. 9, 2005.
Office Action issued in copending U.S. Appl. No. 09/629,175, dated Nov. 29, 2005.
Office Action issued in copending U.S. Appl. No. 09/629,175, dated Jun. 23, 2009.
Office Action issued in copending U.S. Appl. No. 09/629,175, dated Sep. 21, 2009.
Office Action issued in copending U.S. Appl. No. 12/643,662, dated Mar. 1, 2011.
Office Action issued in copending U.S. Appl. No. 12/643,662, dated Aug. 17, 2011.
Notice of Allowance in copending U.S. Appl. No. 12/643,662, dated Oct. 24, 2011.
U.S. Appl. No. 12/643,662, filed Dec. 21, 2009, Ophir Frieder et al., Alion Science and Technology Corporation.
Broder A. Z.: "On the Resemblance and Containment of Documents," Compression and Complexity of Sequences 1997. Jun. 11-13, 1997, pp. 21-29.
Broder A. Z.: "Syntactic Clustering of the Web" Computer Networks and ISDN Systems, vol. 29, No. 8-13, Sep. 1, 1997, pp. 1157-1166.
Brin et al.: "Copy Detection Mechanisms for Digital Documents," SIGMOD Record, Association for Computing Machinery, vol. 24, No. 2, Jun. 1, 1995, pp. 398-409.
Manber U: "Finding Similar Files in a Large File System," Proceedings of the Winter USENIX Conference, pp. 1-10, Jan. 17, 1994.
Shivakumar et al.: "Finding Near-Replicas of Documents on the Web," International Workshop WEBDB, 1997, pp. 204-212.
N. Heintze, "Scalable Document Fingerprinting," *Proceedings of the Second USENIX Workshop on Electronic Commerce*, 1996.
International Search Report dated Jan. 10, 2003 in corresponding International Patent Application No. PCT/US01/41464.

SYSTEM FOR SIMILAR DOCUMENT DETECTION

CROSS REFERENCE TO RELATED APPLICATIONS

This application is a Continuation application of U.S. patent application Ser. No. 12/643,662, filed on Dec. 21, 2009, now U.S. Pat. No. 8,131,724 which is a Continuation application of U.S. patent application Ser. No. 09/629,175, filed on Jul. 31, 2000, now U.S. Pat. No. 7,660,819, the contents of which are hereby incorporated by reference.

FIELD OF THE INVENTION

The invention relates to a system for similar document detection and, more particularly, to detecting whether a document is similar to another document in a document collection.

REFERENCES

For the convenience of the reader, the publications referred to in the specification are listed below. In the specification, the numerals within square brackets refer to the respective publications. The listed publications are incorporated herein by reference.

[1] S. Lawrence and C. L. Giles, "Accessibility of Information on the Web," *Nature*, vol. 400, Jul. 8, 1999.

[2] http://nccam.nih.gov, The National Institutes of Health (NIH), National Center for Complementary and Alternative Medicine (NCCAM), Apr. 12, 2000.

[3] A Z. Broder, S. C. Glassman, M. S. Manasse, and G Zweig, "Syntactic Clustering of the Web," Sixth International World Wide Web Conference, April, 1997.

[4] S. Brin, J. Davis, and H. Garcia-Molina, "Copy Detection Mechanisms for Digital Documents," *Proceeding of the ACM SIGMOD Annual Conference*, 1995.

[5] N. Shivakumar and H. Garca-Molina, "Finding Near-Replicas of Documents on the Web," *Proceedings of Workshop on Web Databases* (WebDB'98), March 1998.

[6] N. Shivakumar and H. Garcia-Molina, "SCAM: A Copy Detection Mechanism for Digital Documents," *Proceedings of the Second International Conference on Theory and Practice of Digital Libraries*, June 1995.

[7] N. Shivakumar and H. Garcia-Molina, "Building a Scalable and Accurate Copy Detection Mechanism," *Proceedings of Third International Conference on Theory and Practice of Digital Libraries*, March 1996.

[8] N. Heintze, "Scalable Document Fingerprinting," *Proceedings of the Second USENIX Workshop on Electronic Commerce*, 1996.

[9] C. Buckley, C. Cardie, S. Mardis, M. Mitra, D. Pierce, K. Wagstaff, and J. Walz, "The Smart/Empire TIPSTER IR System," *TIPSTER Phase III Proceedings*, Morgan Kaufmann, 2000.

[10] V. Chalana, A. Bruce, and T. Nguyen, "ata Analysis Products Division:Duplicate document Detection in DocBrowse," www.statsci.com/docbrowse/paper/spie98/node1.htm, Jul. 31, 1999.

[11] G. Salton, A. Wong, and C. S. Yang, "A Vector[-]Space Model for Automatic Indexing," Comm. of the ACM, vol. 18, no. 11, pp. 619.620, November 1975.

[12] M. F. Porter, "An Algorithm for Suffix Stripping," *Program*, vol. 14, no. 3, pp. 130-137, 1980.

[13] B. Kjell, W. A. Woods, and O. Frieder, "Discrimination of Authorship Using Visualization," *Information Processing and Management*, Pergamon Press, vol. 30, no. 1, pp. 141-150, January 1994.

[14] R. S. Scotti and C. Lilly, "Analysis and Design of Test Corpora for Zero-Tolerance Government Document Review Process," Symposium for Document Image Understanding Technology, Annapolis, Md., April, 1999, also reported at George Washington University Declassification Productivity Research Center, http://dprc.seas.gwu.edu, Jul. 31, 1999.

[15] D. Grossman, D. Holmes, and O. Frieder, "A Parallel DBMS Approach to IR in TREC-3, "Overview of the Third Text Retrieval Conference (TREC-3), November 1994.

[16] A Smeaton, F Kelledy, and G Quinn, "Ad Hoc Retrieval Using Thresholds, WSTs for French Monolingual Retrieval, Document-at-a-Glance for High Precision and Triphone Windows for Spoken Documents," *Proceedings of the Sixth Text Retrieval Conference* (TREC-6), p. 461, 1997.

[17] U.S. Department of Commerce, National Institute of Standards and Technology, "Secure Hash Standard," Federal Information Processing Standards Publication FIPS PUB 180-1, Apr. 17, 1995.

[18] U.S. Department of Commerce, National Institute of Standards and Technology, "Secure Hash Standard," Federal Information Processing Standards Publication FIPS PUB 180, May 11, 1993.

[19] Ronald L Rivest, "The MD4 Message Digest Algorithm," Proceedings of Advances in Cyrptology—CRYPTO '90, Springer-Verlag, pp. 303-311, 1991.

BACKGROUND OF THE INVENTION

The detection of whether a document is similar to another document in a document collection is becoming an important problem due to the tremendous growth of the Internet and data portals (see, e.g., [1]). Document collections are increasing in both the number of documents collections and in the number of documents in document collections due to the ease of transmitting and receiving documents via the Internet and data portals. As the size of a document collection increases, the probability of similar documents being re-submitted or re-indexed in the document collection increases as well. Maintaining similar documents in a document collection not only drains valuable resources for the computation and storage of indices for the document collection but also affects the collection statistics and, hence, potentially the accuracy of searching the document collection.

Storing similar documents in a document collection affects both the accuracy and efficiency of an information search and retrieval engine used with the document collection. Retrieving similar documents in response to a user's query potentially lowers the number of valid responses provided to the user, which thereby lowers the accuracy of the user's response set. Further, processing similar documents necessitates additional computation without introducing any additional benefit to the user, which lowers the processing efficiency of the user's query.

Additionally, similar documents skew collection statistics of the document collection. Collection statistics are typically used as part of a similarity computation of a query for the document collection. With similar documents in the document collection, the collection statistics of the document collection are biased and may affect the overall precision of the document collection and its information search and retrieval engine.

The need to detect similar documents arises in various types of document collections. As an example, for a document collection of documents received via the Internet, similar documents are undesirable additions to the document collection, and similar document detection would be useful prior to adding another document to the document collection. As another example, for a document collection of classified documents, similar documents need to be identified for either declassification or classification, and similar document detection would be useful for document declassification or document classification. As another example, for a document collection of electronic mail (e-mail) documents, similar e-mail documents need to be identified for processing the document collection, and similar document detection would be useful for e-mail traffic processing, which may be continuous. As a potential difficulty with processing a document collection of e-mail documents, many e-mail documents have a short length and, hence, may prove difficult to detect as similar documents.

As another example of the need to detect similar documents, consider searching web documents (e.g., documents available over the Internet via the world wide web format), which typically have a short length (e.g., typically around 4 kilobytes (KB) (see, e.g., [1])). With web documents, one might believe that matching the uniform resource locator (URL) would identify similar documents. However, because many web sites use dynamic presentation, where the content changes depending on the region or other variables, relying on the URL is of little value. Further, data providers often create names for one web site to attract users with different interests or perspectives. For example, the web sites www.fox4.com, onsale.channel9.com, and www.realtv.com all point to an advertisement for realTV.

As another example of the need for detection of similar documents, similar documents can populate a document collection when multiple document sources are used. For instance, the National Center for Complementary and Alternative Medicine (NCCAM) (see, e.g., [2]), supports an information search and retrieval engine for a document collection of medical data having inputs from multiple sources of medical data. Given the nature of the medical data, similar documents in the document collection can be common. Because unique document identifiers are most likely not possible when the document identifiers originate from different sources, the detection of similar documents is essential to produce non-redundant results for the information search and retrieval engine.

Conventional techniques for detecting similar documents can be divided into three categories: shingling techniques; similarity measure techniques; and image processing techniques. As the first category, shingling techniques were developed by various researchers, for example: DSC [3], COPS [4]; SCAM [5], [6], and [7], which is a successor to COPS; and KOALA [8]. The shingling technique uses a set of contiguous terms, or shingles, for a document and compares the number of matching shingles. The shingles can be considered to be subdocuments for the document. With the comparison of subdocuments between two documents, a percentage of overlap is calculated between the two documents. For the shingling technique, a hash value is determined for each subdocument, and the hash values for each subdocument are filtered to reduce the number of comparisons performed, which improves the runtime performance of the shingling technique. With the shingling technique, a document is not compared to other documents, and instead, subdocuments are compared. By using subdocuments, instead of documents, each comparison may produce many potential similar documents. With the shingling technique, by returning many potential matches of similar documents, a large amount of user involvement is required to sort potential similar documents, which dilutes the usefulness of the shingling technique.

To overcome the basic efficiency issues with the shingling technique, several optimization techniques for the shingling technique were proposed to reduce the number of comparisons made. For example, removing frequently occurring shingles (see, e.g., [8]) and retaining only every twenty-fifth single (see, e.g., [3]) were proposed. With these optimization techniques, the computation time of the shingling technique is reduced. However, because no semantic premise is used to reduce the volume of data, a degree of randomness is introduced to the comparison process, which results in relatively non-similar documents being identified as potential similar documents.

In terms of computational time complexity, the shingling technique has order $O(kd \log(kd))$, where k is the number of shingles per document, and d is the number of documents in the document collection. Even with the performance-improving technique of removing shingles occurring in over 1,000 documents and keeping only every twenty-fifth shingle, the implementation of the DSC took 10 days to process 30 million documents [3].

As an alternative to the DSC shingling technique, the DSC-SS shingling technique was proposed [3]. The DSC-SS shingling technique uses super shingles, in which several shingles are combined in a super shingle, which results in a document having a few super shingles, instead of many shingles. With the DSC shingling technique, the similarity between documents was measured as a ratio of matching shingles in two documents, and with the DSC-SS shingling technique, the similarity between two documents is measured using one super shingle for each document. Using a single super shingle is more efficient than using multiple shingles because a full counting of all overlaps between shingles is no longer required.

In terms of computational time complexity, the run time for DSC-SS shingling technique is of the order $O(kd \log(kd))$, although k is significantly smaller for the DSC-SS shingling technique compared to the k for the DSC shingling technique. Further, the amount of computations required to count overlap is eliminated with the DSC-SS shingling technique, which reduces the overall runtime. Nonetheless, the DSC-SS shingling technique reportedly does not work well for documents having a short length. Moreover, the shingling technique and its optimization attempts are very sensitive to adjustments in the size of shingles and the frequency of retained shingles.

As the second category, similarity measure techniques were proposed in, for example, [9] and [10]. The similarity measure techniques are similar to prior work done in document clustering (see, e.g., [11]). A similarity measure technique uses similarity computations to group potentially similar documents and compares each document pair-wise. Because of the pair-wise comparison, a similarity measure technique is computationally prohibitive because the computational time complexity is of the order $O(d^2)$, where d is the number of documents.

To make the similarity measure technique computationally feasible, document terms are identified for each document, and a document collection is searched using the document terms. With the enhanced similarity measure technique, document terms are initially identified for a document to be compared to the document collection. Each term for the document is used to search the document collection, and a final weight is produced for each document in the document collection having a matching term. The document in the document collection having the largest weight is determined to be the most similar document. By using the document as a query with the similarity measure technique, clustering of the documents results. Even the enhanced similarity measure technique becomes computationally unfeasible for a large or dynamic document collection because each document must be queried against the entire collection.

As the third category, image processing techniques were proposed in, for example, [13] and [14]. An image processing technique processes documents as images to determine similar documents. The image processing technique maps the similar document detection problem into an image-processing domain, rather than into the text-processing domain as with the shingling technique, the similarity measure technique, and the parsing filtering technique.

There exists a need for a technique to detect whether a document is similar to another document in a document collection, where the technique is scalable to and computationally feasible for any size of document and any size of document collection.

SUMMARY OF THE INVENTION

An object of the invention is to provide a technique to detect whether a document is similar to another document in a document collection, where the technique is scalable to and computationally feasible for any size of document and any size of document collection.

The invention includes a method, an apparatus, and an article of manufacture for detecting similar documents.

The method of the invention includes a method for detecting similar documents comprising the steps of obtaining a document; filtering the document to obtain a filtered document; determining a document identifier for the filtered document and a hash value for the filtered document; generating a tuple for the filtered document, the tuple comprising the document identifier for the filtered document and the hash value for the filtered document; comparing the tuple for the filtered document with a document storage structure comprising a plurality of tuples, each tuple in the plurality of tuples representing one of a plurality of documents, each tuple in the plurality of tuples comprising a document identifier and a hash value; and determining if the tuple for the filtered document is clustered with another tuple in the document storage structure, thereby detecting if the document is similar to another document represented by the another tuple in the document storage structure.

The method of the invention includes a method for detecting similar documents comprising the steps of: obtaining a document; parsing the document to remove formatting and to obtain a token stream, the token stream comprising a plurality of tokens; retaining only retained tokens in the token stream by using at least one token threshold; arranging the retained tokens to obtain an arranged token stream; processing in turn each retained token in the arranged token stream using a hash algorithm to obtain a hash value for the document; generating a document identifier for the document; forming a tuple for the document, the tuple comprising the document identifier for the document and the hash value for the document; inserting the tuple for the document into a document storage tree, the document storage tree comprising a plurality of tuples, each tuple located at a bucket of the document storage tree, each tuple in the plurality of tuples representing one of a plurality of documents, each tuple in the plurality of tuples comprising a document identifier and a hash value; and determining if the tuple for the document is co-located with another tuple at a same bucket in the document storage tree, thereby detecting if the document is similar to another document represented by the another tuple in the document storage tree.

The method of the invention includes a method for detecting similar documents comprising the steps of: determining a hash value for a document; accessing a document storage structure comprising a plurality of hash values, each hash value in the plurality of hash values representing one of a plurality of documents; and determining if the hash value for the document is equivalent to another hash value in the document storage structure, thereby detecting if the document is similar to another document represented by the another hash value in the document storage structure.

The method of the invention includes a method for detecting similar documents comprising the step of comparing a document to a plurality of documents in a document collection using a hash algorithm and collection statistics to detect if the document is similar to any of the documents in the document collection.

The system of the invention includes a computer system including a computer-readable medium having software to operate a computer in accordance with the invention.

The apparatus of the invention includes a computer including a computer-readable medium having software to operate the computer in accordance with the invention.

The article of manufacture of the invention includes a computer-readable medium having software to operate a computer in accordance with the invention.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

DETAILED DESCRIPTION OF THE INVENTION

In describing the invention, the following definitions are applicable throughout.

A "document" refers to a computer-readable file comprising text. As an option, the document comprises text and at least one of the following: an image, a graphical object, audio, video, and the like. The invention is not restricted as to the size of a document.

A document is referred to as being "similar" to another document if the two documents contain roughly the same semantic content, whether or not the two documents are a precise syntactic match. For example, two documents are similar if the two documents are highly the same, near duplicates, or duplicates. As another example, two documents are similar if the two documents have a sufficient measure of resemblance (see, e.g., [3] and [8]).

A "token" refers to any representation of context in a document. Examples of a token include: a word; a phrase (e.g., "New York," or "to be or not to be"); a portion of a word (e.g., ing, or qu), which is known as an n-gram, or a bi-gram, a tri-gram, and so on a symbol; a number; any plural thereof; and any combination thereof.

A "tuple" refers to a data structure having two or more portions.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer, a mini-computer; a workstation; a micro-computer; a server; an interactive television; and a hybrid combination of a computer and an interactive television. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; and programmed logic.

A "computer system" refers to a system having a computer, where the computer includes a computer-readable medium embodying software to operate the computer.

A "network" refers to a number of computers and associated devices that are connected by communication facilities. A network involves permanent connections such as cables or temporary connections such as those made through telephone or other communication links. Examples of a network include: an internet, such as the Internet; an intranet; a local area network (LAN); a wide area network (WAN); and a combination of networks, such as an Internet and an intranet.

Figure 1:
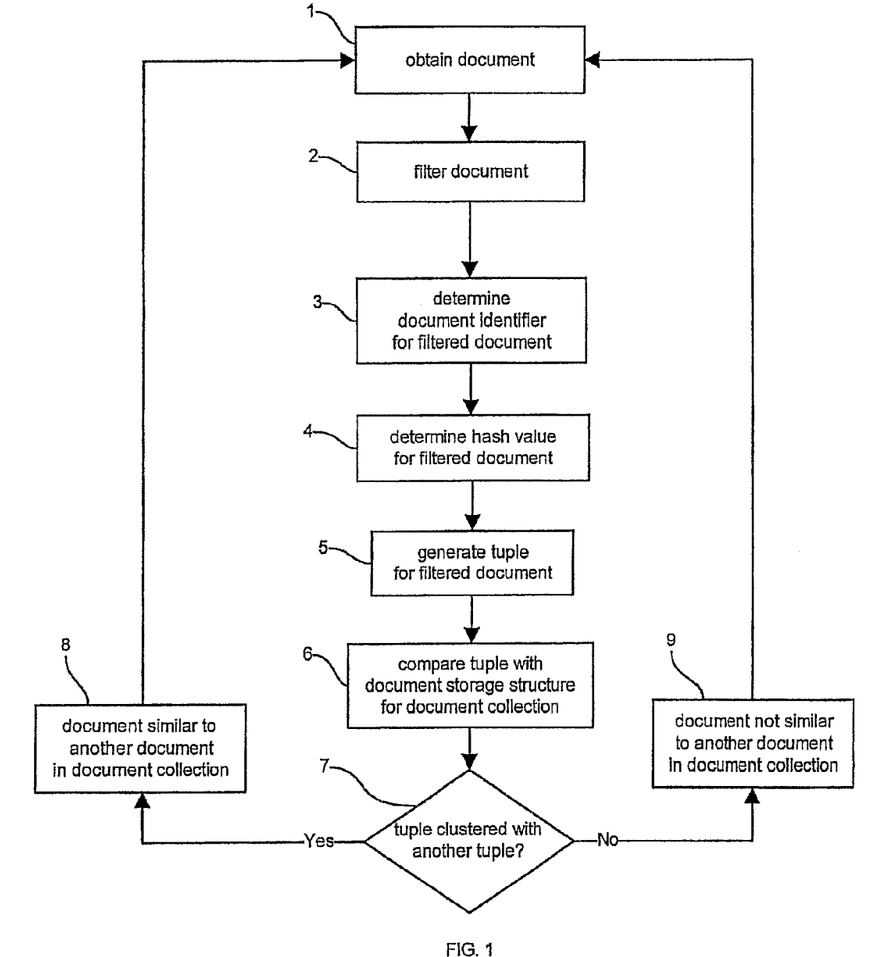
FIG. 1 illustrates a flow diagram for the invention.

FIG. 1 illustrates a flow diagram for the invention. The flow diagram in FIG. 1 is used to detect whether a document is similar to another document in a document collection. In one embodiment, the goal in the detection is to build a document collection without any similar documents. In another embodiment, the goal in the detection is to remove similar documents from the document collection. In another embodiment, the goal in the detection is to identify and/or group similar documents in the document collection. In another embodiment, the goal in the detection is to determine where similar documents in the document collection are stored.

In block 1, a document is obtained. In one embodiment, the document is a document in the document collection, and in another embodiment, the document is not a document in the document collection. The document is obtained through any manner used by a computer system to obtain a document. For example, the document is obtained from a computer-readable medium of the computer system. As another example, the document is obtained via a network, such as the Internet. As a further example, the document is obtained by scanning a paper document and using optical character recognition software and the scanned paper document to obtain the document.

In block 2, the document is filtered to obtain a filtered document. Preferably, the document is filtered using collection statistics. In one embodiment, the collection statistics are based on the document collection. In another embodiment, the collection statistics are based on knowledge of the language of the document. In yet another embodiment, the collection statistics are based on one or more other document collections. Further, the collection statistics can be any combination of the above embodiments. Filtering the document for one embodiment of the invention is further discussed with respect to FIG. 2.

Figure 2:
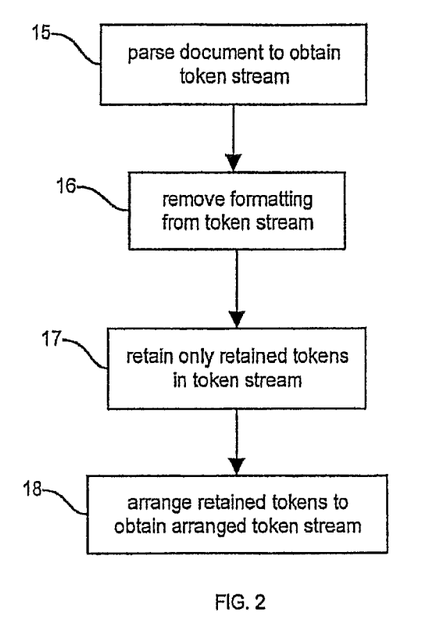
FIG. 2 illustrates a flow diagram for filtering a document.

FIG. 2 illustrates a flow diagram for filtering the document to obtain the filtered document. In block 15, the document is parsed to obtain a token stream. The token stream of the document comprises at least one token. However, for a trivial case, a document having no tokens may result from the parsing.

In block 16, formatting is removed from the token stream. Examples of formatting in a document include font size, bold, and left justify. Formatting in a document affects whether a document is similar to another document. By removing formatting from the document, the number of documents that are considered similar is increased. In one embodiment, depending on the type of document, formatting in the document may be represented by format tags. If format tags are used, the format tags are removed from the token stream in block 16.

In block 17, the token stream is examined such that only retained tokens are retained in the token stream. A determination is made whether each token in the token stream should be retained (i.e., a retained token) or should be removed from the token stream. Those tokens in the token stream that are not retained as retained tokens are removed from the token stream. Generally, at least one token is determined not to be a retained token and is removed from the token stream. For the trivial case, all tokens are determined to be retained tokens, and no tokens are removed from the token stream. By retaining some tokens and removing other tokens from the token stream, the effects of non-content changes in the document are minimized.

In one embodiment, a token is removed from the token stream if the token appears more than once in the token stream. The token is removed from the token stream if the token is a duplicate of another token in the token stream. As an option, instead of removing a duplicate token from the token stream, a replication count is maintained for each token appearing more than once in the token stream.

In another embodiment, a token is removed from the token stream if the token represents a stop word. A "stop word" is any non-discriminatory token within a given context. In the trivial case, the given context is a complete language. Examples of typical stop words in the English language include: is; a; an; and the. In a non-trivial case, the given context is a document collection, and zero or more document collection-specific stop words are identified from the document collection using collection statistics.

In an additional embodiment, a token is removed from the token stream if the token represents a very frequent token and/or a very infrequent token. For example, a token is removed from the token stream if the token is a very frequent token and is retained in the token to stream as a retained token if the token is not a very frequent token. As another example, a token is removed from the token stream if the token is a very infrequent token and is retained in the token stream as a retained token if the token is not a very infrequent token. As yet another example, a token is retained in the token stream as a retained token if the token is neither a very frequent token nor a very infrequent token and is otherwise removed from the token stream. Because frequently occurring terms in a document often do not add to the semantic content of the document (see, e.g., [15] and [16]), the invention removes very frequent tokens from the token stream. In addition to or in lieu of removing very frequent tokens from the token stream, the invention removes very infrequent tokens from the token stream. The collection statistics are used to determine whether a token is a very frequent token and/or a very infrequent token. The determination of the collection statistics, very frequent tokens, and very infrequent tokens are further discussed below with respect to FIGS. 3 and 4.

In a further embodiment, a token is removed from the token stream based on a determination as to which part of speech the token represents. Examples of parts of speech include; a noun, a verb, an adjective, an adverb, a preposition; and a type of noun (e.g., a person, a place, a thing). For example, a token is removed from the token stream if the token represents and/or does not represent a desired part of speech. As another example, a token is removed from the token stream lithe token does not represent a noun, and a token is retained in the token stream as a retained token if the token represents a noun. As yet another example, a token is removed from the token stream if the token represents a preposition, and a token is retained in the token stream as a retained token if the token does not represent a preposition.

In a still further embodiment, a token is removed from the token stream based on a ranking of a part of speech represented by the token. With the collection statistics, each token in the document collection is ranked according to its number of appearances in the document collection with respect to the part of speech represented by the token. For example, all tokens representing nouns in the document collection are ranked as to their number of appearances in the document collection as compared to all other nouns in the document collection. With the rankings, a determination is made whether to remove or retain a token in the token stream. For example, a token is removed from the token stream if the token represents a noun that occurs very frequently in the document collection and is retained in the token stream as a retained token if the token represents a noun that does not occur very frequently in the document collection. As another example, a token is removed from the token stream if the token represents a noun that occurs very infrequently in the document collection and is retained in the token stream as a retained token if the token represents a noun that does not occur very infrequently in the document collection. As yet another example, a token is retained in the token stream as a retained token if the token represents a noun that occurs neither very frequently nor very infrequently in the document collection and is otherwise removed from the token stream.

In addition to the above embodiments for block 17, other techniques are available for identifying which tokens to retain or remove from the token stream. Further, tokens can be retained or removed according to any combination of the above embodiments for block 17. The above embodiment using very frequent tokens and/or very infrequent tokens to retain and remove tokens from the token stream is further discussed with respect to FIG. 3.

Figure 3:
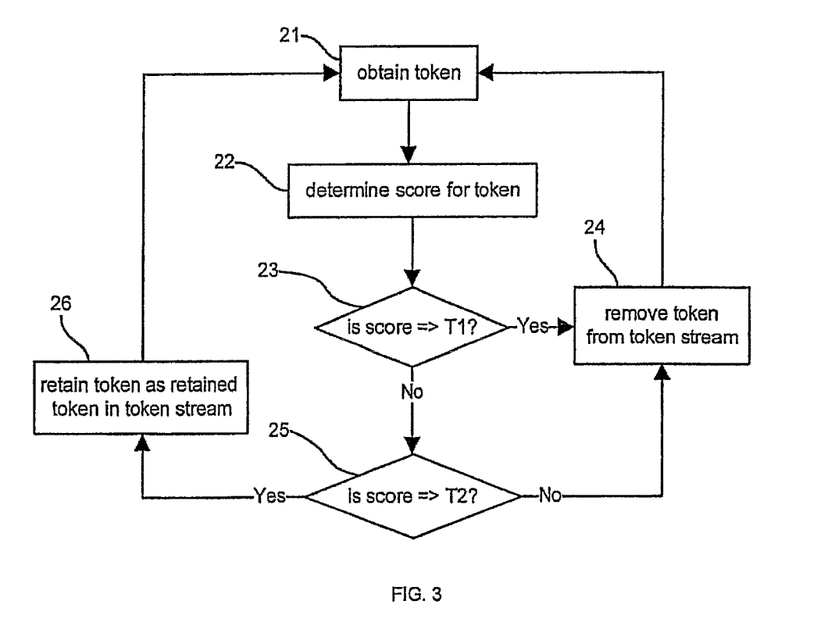
FIG. 3 illustrates a flow diagram for retaining only retained tokens in a token stream.

FIG. 3 illustrates a flow diagram for retaining only retained tokens in a token stream using identified very frequent tokens and/or very infrequent tokens. In this illustration, a token is retained as a retained token in a token stream if the token is neither a very frequent token nor a very infrequent token. Two thresholds, namely threshold T1 and threshold T2, are determined based on the collection statistics for assessing whether a token is a very infrequent token or a very frequent token, respectively.

In block 21, a token in the token stream is obtained.

In block 22, a score is determined for the token. The score for the token is preferably based on the collection statistics (e.g., the number of times a token occurs in the document collection and the number of documents in the document collection). For instance, an exemplary equation for determining the score of a token is the equation for inverted document frequency (IDF):

$$\text{score} = \log(D/F(i)) \qquad (1)$$

where D is the number of documents in the document collection and F(i) is the number of documents in the document collection in which the token i appears.

In block 23, the score is compared to the threshold T1, which is the threshold used to identify if the token is a very infrequent token. If the score for the token is less than the threshold T1, flow proceeds to block 25. If the score for the token is greater than or equal to the threshold T1, flow proceeds to block 24.

In block 24, the score for the token is greater than or equal to the threshold T1, which indicates that the token is a very infrequent token. Hence, in block 24, the token is removed from the token stream. Flow proceeds to block 21 if there is another token in the token stream to process.

In block 25, the score for the token is less than the threshold T1, which indicates that the token is not a very infrequent token. In block 25, the score is compared to the threshold T2, which is the threshold used to identify a very frequent token. If the score for the token is less than the threshold T2, flow proceeds to block 24. If the score for the token is greater than or equal to the threshold T2, flow proceeds to block 26.

If the flow proceeds from block 25 to block 24, the token is removed from the token stream as being a very frequent token.

In block 26, the token is a token which is neither a very infrequent token nor a very frequent token, and the token is retained as a retained token in the token stream. From block 26, flow proceeds to block 21 if there is another token in the token stream to process.

As an option for FIG. 3, the order of blocks 25 and 23 are switched. As another option, instead of a high score indicating a very frequent token, a high score indicates a very infrequent token. As another option, a single threshold is used by removing either block 23 or block 25 from FIG. 3. As another option, other techniques for retaining and removing tokens from the token stream are included in FIG. 3.

Referring back to FIG. 2, in block 18, the retained tokens in the token stream are arranged to obtain an arranged token stream. Preferably, the retained tokens are arranged in Unicode ascending order. Unicode is a character and coding standard that represents almost all of the written languages of the world. As an option, the retained tokens are arranged in Unicode descending order. As an option, the tokens are arranged according to any technique or standard. Examples of other techniques and standards for arranging the tokens include: alphabetizing; arranging by symbols; arranging by numbers; arranging by non-English letters; or arranging by another character and coding standard, such as the American Standard Code for Information Interchange (ASCII), extended ASCII, and Extended Binary Coded Decimal Interchange Code (EBCDIC).

Using the flow diagram of FIG. 2 to implement block 2, the filtered document obtained from block 2 comprises an arranged token stream. Other techniques for obtaining a filtered document can be used. For example, in one embodiment, the flow diagram of FIG. 2 is implemented without block 18. As another example, the order of blocks 15 and 16 in FIG. 2 are switched.

Referring back to FIG. 1, in block 3, a document identifier is determined for the filtered document. The document identifier uniquely identifies the document from the other documents in the document collection. For example, the document identifier can be a number which is serially determined based on a previous number assigned to a previous document.

In block 4, a hash value is determined for the filtered document. Using the arranged token stream for the filtered document from FIG. 2, the hash value for the filtered document is determined by processing individually each retained token in the arranged token stream. Examples of hash algorithms include the following: a hash algorithm; a standard hash algorithm; a secure hash algorithm; the hash algorithm SHA-1, which is described in [17]; the hash algorithm SHA, which is described [18]; the message digest algorithm MD 4, which is described in [19]; and any algorithm used to map an identifier to a numerical value associated with a location of a data structure.

Preferably, the hash value for the filtered document is determined using a hash algorithm having an approximately even distribution of hash values. More preferably, the hash value for the filtered document is determined using a secure hash algorithm. With a secure hash algorithm, the probability of two token streams creating the same hash value is reduced. Even more preferably, the hash value for the filtered document is determined using the hash algorithm SHA-1. With the hash algorithm SHA-1, each retained token in the arranged token stream is processed individually to obtain a hash value for the filtered document. With the SHA-1 hash algorithm, which uses 160 bits, the probability of duplicate values for different token streams is $P(2^{-160})$.

In block 5, a tuple is generated for the filtered document. Preferably, the tuple comprises the document identifier determined in block 3 and the hash value determined in block 4. As an option, additional information can be included. An example of additional information for the tuple includes the source of the document (e.g., the file pathname of the document).

In block 6, the tuple for the filtered document is compared with a document storage structure for the document collection. The document storage structure for the document collection comprises any data structure that is efficient for storing and accessing representations of the documents in the document collection. Examples of data structures useful for the document storage structure include the following: a hash table; a tree, such as a binary tree, a balanced binary tree, and a red-black binary tree; a queue; a ring; an array; and any combination of data structures. Preferably, the document storage structure is a combination of a hash table and a tree. More preferably, the document storage structure is a combination of a hash table and a binary tree. Even more preferably, the document storage structure is a combination of a hash table and a balanced binary tree.

Preferably, each document in the document collection is processed to obtain a tuple similar to the tuple generated in block 5, and each tuple representing a document in the document collection is stored in the document storage structure. The generation of the document storage structure for the document collection is further discussed below with respect to FIG. 4.

Figure 5:
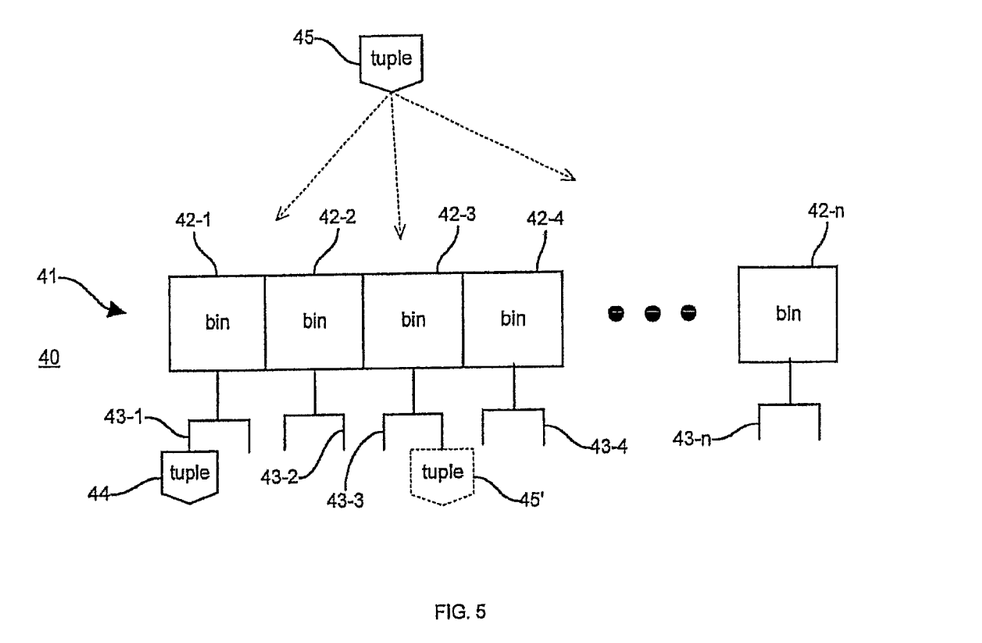
FIG. 5 illustrates an embodiment of a document storage structure of the invention.

FIG. 5 illustrates a preferred embodiment of a document storage structure of the invention. The document storage structure 40 comprises a combination of a hash table 41 and at least one tree. The hash table 41 includes bins 42-1, 42-2, 42-3, etc. As an example, if the hash algorithm of block 4 is the hash algorithm SHA-1, the hash table has up to $2^{160}$ bins. Each bin 42-1, 42-2, 42-3, etc. has a corresponding tree 43-1, 43-2, 43-3, etc., respectively. Each tree 43-1, 43-2, 43-3, etc. is, for example, a balanced binary tree. Each bin has zero or more tuples from the document collection associated with the bin, and each tuple associated with the bin is arranged according to the tree corresponding to the bin. For example, bin 42-1 has a tuple 44 for the document collection attached to the tree 43-1. If a bin has no tuples, the tree is empty or comprises nulls, or the tree is not developed. If a bin has one or more tuples, the tree includes the tuples. Each tuple for the document collection is hashed into the document storage structure 40.

To compare the tuple with the document storage structure, the tuple is preferably inserted into the document storage structure. Referring back to FIG. 5, the tuple 45 for the document is compared to the document storage structure 40. Preferably, the hash value for the tuple 45 is hashed into the hash table of the document storage structure 40. If bin 42-3 of the hash table 41 matches the hash value for the tuple 45, the tuple 45 is inserted into the document storage structure as tuple 45' in the tree 43-3 of bin 42-3. If a bin does not yet exist in the hash table for the tuple 45, a bin in the hash table and a corresponding tree are created for the tuple 45.

As an example, if the document storage structure is a hash table, the tuple for the filtered document is inserted into the hash table by placing the tuple into a bin (or, e.g., entry) of the hash table or by creating a bin for the hash table.

As another example, if the document storage structure is a tree, the tuple for the filtered document is inserted into the tree by inserting the tuple into an existing branch (or, e.g., bucket) of the tree or creating a new branch for the tree.

As an option, the hash value for the tuple, instead of the tuple, is inserted into the document storage structure.

As an option, the document storage structure is scanned to determine if a tuple exists which has a hash value that is the same as hash value for the tuple of the document.

As an option, the document storage structure is scanned to determined if a hash value exists which is the same as the hash value for the tuple of the document.

In block 7, it is determined whether the tuple for the filtered document is clustered with another tuple in the document storage structure. If the document storage structure is a tree, the tuple is clustered with another tuple in the tree if the tuple is co-located with another tuple in a bucket of the tree. If the document storage structure is a hash table, the tuple for the filtered document is clustered with another tuple if the tuple for the filtered document is co-located with another tuple at an entry of the hash table. If the tuple for the filtered document is clustered with another tuple in the document storage structure, flow proceeds to block 8. If the tuple for the filtered document is not clustered with another tuple in the document storage structure, flow proceeds to block 9.

In block 8, the tuple for the filtered document is clustered with another tuple in the document storage structure, and the document is determined to be similar to another document in the document collection. In one embodiment, the tuple for the document is removed from the document storage structure (if the tuple was inserted into the document storage structure), and the document is not added to the document collection. If another document is to be processed, flow proceeds back to block 1.

In block 9, the tuple for the filtered document is not clustered with another tuple in the document storage structure, and the document is determined not be similar to any other document in the document collection. In one embodiment, the tuple for the document is retained in the document storage structure (if the tuple was inserted into the document storage structure), and the document is added to the document collection. If another document is to be processed, flow proceeds back to block 1.

Figure 4:
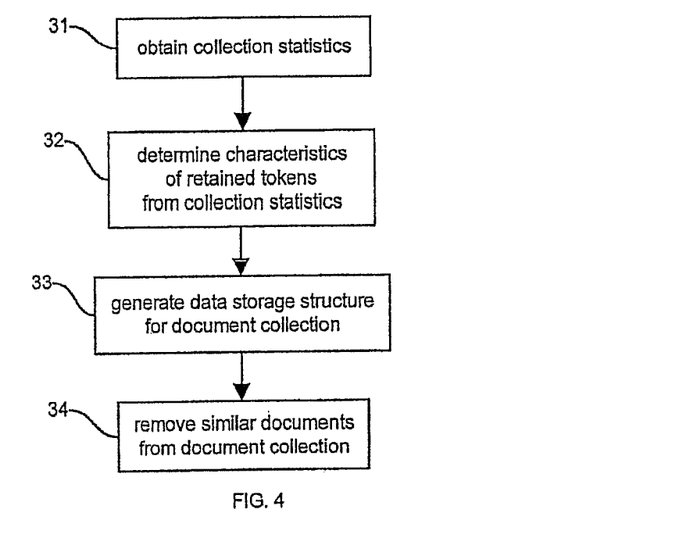
FIG. 4 illustrates a flow diagram for generating a document storage structure for a document collection.

FIG. 4 illustrates a flow diagram for generating the document storage structure for the document collection. Prior to processing a document according to FIG. 1, the document storage structure for the document collection must be generated.

In block 31, collection statistics are obtained. As discussed above for block 2 in FIG. 1, several embodiments are possible for the collection statistics. If the collection statistics are based on the document collection, a single pass of the document collection is made, and collection statistics of the document collection are ascertained. Examples of collection statistics for the document collection include the following: the number of occurrences for each token of the document collection; the number of documents in the document collection; the score (e.g., the inverted document frequency) of each token; the proximity of each token to another token in the document collection.

If the collection statistics are based on one or more other document collections, a single pass of each document collection is made, and the collection statistics of the other document collections are ascertained.

In block 32, characteristics of retained tokens are determined from the collection statistics. For example, the characteristics are based on very frequent tokens and/or very infrequent tokens identified from the collection statistics. A score for each token in the document collection is generated using, for example, equation (1). With the score, very infrequent tokens are identified as those tokens having a score greater than or equal to the first threshold T1, and very frequent tokens are identified as those tokens having a score less than the second threshold T2. The thresholds T1 and T2 are used as discussed above for FIG. 3. As discussed above, either one or both of the thresholds T1 and T2 can be used with the invention. As another example, one or more stop words are identified from the collection statistics and are used to determine retained tokens.

In block 33, the data storage structure for the document collection is generated using the characteristics of retained tokens determined from the collection statistics in block 32. Each document in the document collection is processed according to FIG. 1. For block 17, the characteristics of retained tokens from block 31 are used to retain only retained tokens in the token stream. For block 8, the tuples for similar documents are clustered in the document storage structure. For block 9, additions to the document storage structure are created for each document that is not similar to another document already represented in the document storage structure. The flow diagram illustrated in FIG. 1 is repeated for each document in the document collection.

In block 34, similar documents are removed from the document storage structure. The document storage structure is traversed, and tuples clustered together are identified. For clustered tuples, all but one of the clustered tuples are removed from the data structure, and the documents corresponding to the removed clustered tuples are removed from the document collection as being similar documents.

Figure 6:
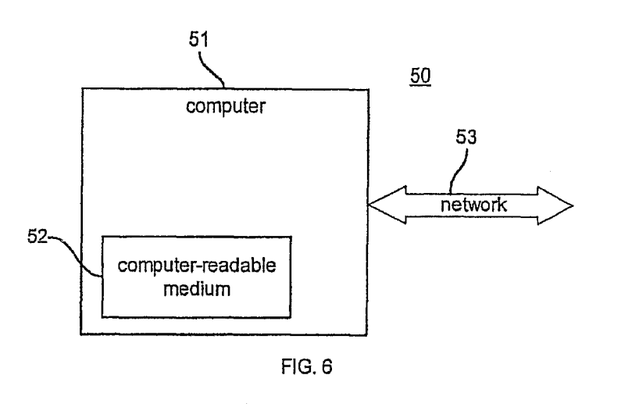
FIG. 6 illustrates a plan view for a computer system for the invention.

FIG. 6 illustrates a plan view for a computer system for the invention. The computer system 50 includes a computer 51 for implementing the invention. The computer 51 includes a computer-readable medium 52 embodying software for implementing the invention and/or software to operate the computer 51 in accordance with the invention. As an option, the computer system 50 includes a connection to a network 53. With this option, the computer 51 is able to send and receive documents from other computer systems via the network 53.

Appendix A provides exemplary pseudo-code for implementing the invention. For the pseudo-code, the SHA-1 hash algorithm is used to determine the hash value for block 4, a balanced binary tree is used as the document storage structure for block 6, and Unicode ascending order is used for block 18. Although the pseudo-code is commented, several of the functions and objects of the pseudo-code are discussed next.

LoadDocDB is a function that loads the document storage structure into the computer-readable medium of the computer and creates the appropriate memory data structures. The document storage structure for the document collection contains the tuples for the document collection, namely the hash value (which is designated as the SHA-1 digest value "Digest" in the pseudo-code) and the corresponding document identifier (which is designated as "DocID" in the pseudo-code). To store the data in memory for fast access, a combination of a hash table and at least one balanced binary tree are used, as illustrated in FIG. 5. Because a balanced binary tree is used to store the collisions in the hash (i.e., when two documents have the same hash value), an average access time of order $O(\log(N/B))$ is obtained, where N is the number of documents in the document collection and B is the number bins used by the hash algorithm. An object representing the document storage structure and the access method for the document storage structure are returned by the LoadDocDB function.

DigestDB is a handle to the data structure returned by the LoadDocDB function. Specifically, DigestDB is a hash table based on the SHA-1 digest and the trees of the hash values for each bin of the hash table and the corresponding access and modification methods.

GetDocsToProcess is a function that returns a list of documents to process. The return object of the GetDocsToProcess function contains a list and the access method for the data represented by the list.

SHA1 Object provides an encapsulation of the table block and the SHA-1 hash algorithm. SHA1 Object provides functions to add text blocks to the digest and to calculate the final digest value.

The Parser Object takes a document handle or stream and returns tokens until the document is traversed. The Parser is responsible for removing formatting from the document, including format tags, if any, and returning tokens. By abstracting the Parser to the basic functions, new document types can be added to the system by creating a new parser object for the new type of document.

Tree is a generic data structure. As objects are added to the Tree data structure, the objects are ordered and stored as a balanced binary tree.

Iterator is an object used as a generic pointer for traversing data structures. Iterator is used in the pseudo-code to traverse the Tree data structure. An object like the Iterator object is common to the Standard Template Library (STL) for the C++ software language and to the collection classes of the JAVA software language.

The embodiments and examples discussed herein are non-limiting examples.

The invention has been described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

APPENDIX A

Pseudo-Code for the Invention

```
/*  Load existing document database into memory.
    The data structure used is a hash with each hash value pointing to a balanced tree
    containing the ordered pair (Digest, DocId). The data structure is searched via the
    digest value.   */
DigestDB = LoadDocDB ( dbname ) ;
/*  Load the list of stop words to ignore and create a hash table.
    -- This step is optional if the user does not desire stop word removal    */
stopwordHash = LoadStopWordList (filename) ;
/*  Get a list of new documents to process.    */
DocsToProcess = GetDocsToProcess (processlist) ;
/*  Get first document to process.    */
DocToParse = DocsToProcess.nextDoc( ) ;
/*  Continue as long as there are documents to process    */
While ( DocToParse )
{
    /*  Create SHA1 Digest Object for current document    */
    SHA1 sha1 = new SHA1( ) ; //
    /*  Create Parser Object for current document    */
    Parser parser = new Parser(DocToParse) ;
    /*  The derived tree represents all the unique tokens from the current document.
        The tree is ordered in Unicode ascending order    */
    Tree docTokens = new Tree( ) ;
    /*  Continue iteration for as long as there are tokens to process */
    for ( ;; )
    {
        /*  Get the next token from the document    */
        token = parser.getNext( ) ;
        /*  If there are no more tokes to process, exit loop    */
        if ( token == null ) break ;
        /*  Using term thresholds, retain only significant tokens.
            If parts of speech are used, remove the ignored parts of speech.
            In the pseudo-code, only the removal of stop words are illustrated. If
            other text components are to be removed, they should be removed at this
            point.    */
        /*  Token is a stop word    */
        if ( stopwordHash.exists( token ) == true ) continue ;
        /*  If there is a collision of tokens in the tree, only one is inserted.
            For the current document, add token to tree of unique tokens    */
        docTokens .add ( token ) ;
    }
    /*  Create an iterator that traverses the tree of unique tokens defining of the current
        document    */
    Iterator iter = new Iterator ( docTokens ) ;
    /*  Loop through the tree of unique tokens for the document and add the token
        to the SHA object.    */
    for ( iter.GetFirst( ); iter < docTokens.size( ); iter++)
    {
        sha1.add ( iter.getValue( ) ) ;
    }
    /*  The computed digest value is created */
    sha1DigestValue = sha1.finish( ) ;
    if ( DigestDB.search ( sha1DigestValue ) )
    {
        /*  This is a similar document. Print message and document name    */
        print ( "We have a duplicate document: %s", DocToParse.name( ) ) ;
    }
    else
    {
        /*  This is not a similar document. Add to the collection    */
        DigestDB.add ( sha1DigestValue, DocToParse.name( ) ) ;
    }
    /*  Get Next Doc to process    */
    DocToParse = DocsToProcess.nextDoc( ) ;
}
/*  Write out the new document database to the file system    */
writeDocDB ( DigestDB, dbname ) ;
```

What is claimed is:

1. A method for detecting similar documents comprising:

at least using one computer configured to implement said method including:

filtering a document to eliminate tokens and obtain a filtered document containing remaining tokens, the tokens being eliminated based on grammatical components;

sorting the filtered document to reorder the tokens according to a predetermined ranking;

comparing a single tuple for the filtered document with a document storage structure comprising a plurality of tuples, each tuple in the plurality of tuples representing one of a plurality of documents; and determining if the tuple for the filtered document is clustered with another tuple in the document storage structure, thereby detecting if the document is similar to another document represented by the another tuple in the document storage structure.

* * * * *